US006718421B1

(12) United States Patent
Conroy

(10) Patent No.: US 6,718,421 B1
(45) Date of Patent: Apr. 6, 2004

(54) INTERCONNECT BUS

(75) Inventor: David G. Conroy, El Granada, CA (US)

(73) Assignee: Webtv Networks, Inc., Mountain View, CA (US)

( * ) Notice: Subject to any disclaimer, the term of this patent is extended or adjusted under 35 U.S.C. 154(b) by 471 days.

(21) Appl. No.: 09/886,692

(22) Filed: Jun. 19, 2001

(51) Int. Cl.⁷ .............................................. G06F 13/40
(52) U.S. Cl. ........................ 710/305; 710/300; 709/251; 370/258
(58) Field of Search ..................... 710/300, 72, 31–34, 710/305, 22; 712/11, 19; 709/251; 370/258, 222

(56) References Cited

U.S. PATENT DOCUMENTS

| 4,177,510 A | * | 12/1979 | Appell et al. ............... 711/163 |
| 5,659,781 A | * | 8/1997 | Larson ......................... 712/11 |
| 6,349,092 B1 | * | 2/2002 | Bisson et al. ............... 370/258 |

OTHER PUBLICATIONS

"Quantifying the benefit of configurability in circuit-switched WDM ring networks" by B. Schein and E. Modiano. (Abstract only).*
Guoping Lu n–Dimensional Processor Arrays with Optical dBuses The Journal of Supercomputing vol. 16, No. 3, Jul. 2000 pp. 149–162.
Jason Cong, Lei He, Cheng–Koh, and Zhigang Pan Global Interconnect Sizing and Spacing with Consideration of Coupling Capacitance IEEE/ACM International Conference on Computer–Aided Design, Digest of Technical Papers Nov. 9–13, 1997 pp. 628–633.
Pasi Kolinummi, Timo Hamalainen, Jukka Saarinen Chained Backplane Communinication Architecture For Scalable Multiprocessor Sytems Journal of Systems Architecture vol. 46, No. 11, Sep. 2000 pp. 955–971.

* cited by examiner

*Primary Examiner*—Gopal C. Ray
(74) *Attorney, Agent, or Firm*—Workman Nydegger

(57) ABSTRACT

A communication method and a bus design for interconnecting a plurality of components in a ring configuration with segments of the bus chaining from one component to another so as to reduce the amount of global wiring between components. One of the components serves as a beginning and end of the ring and controls the operation of the bus by injecting command, address, and write data, at the beginning of the ring and gathering read data at the end of the ring. By chaining components, no bus signal needs to travel further than a single component-to-component hop in any bus cycle. The bus includes unidirectional signal lines that carry data objects and tags in one direction, and carry flow control in the opposite direction. Tags accompany each data object and determine how a component interprets the data object when received.

36 Claims, 11 Drawing Sheets

INTERCONNECT BUS

BACKGROUND OF THE INVENTION

1. The Field of the Invention

The present invention relates to bus architectures. More specifically, the present invention relates to a communication method and bus design that interconnect a plurality of components in a ring configuration with segments of the bus chaining from one component to another so as to reduce the amount of global wiring between components.

2. Background and Related Art

Integrated circuits usually require one or more buses to interconnect each of the various functional components within the integrated circuit. In many circumstances, these types of buses are referred to as "global wire," because generally they run between each and every functional component. For example, control bus 211 and memory bus 212, both of FIG. 2, use global wire buses to interconnect the components of ASIC 210. (Note that referring to control bus 211 and memory bus 212 as global wire is not an admission in any degree that FIG. 2 constitutes prior art with respect to the present invention.)

Buses that use global wire generally provide favorable performance characteristics and are able to move large amounts of data over a relatively short period of time. A bus controller and a processor may be used to manage a global wire bus, with all transactions passing through the bus controller and processor. In other circumstances, a direct memory access controller may be used to provide components with direct access to each other, allowing the bus controller and processor to be bypassed. Some bus operations between components may be relatively insensitive to performance considerations while others are highly dependent on bus speed. For example, the speed with which a component's control register is read or written may impact overall system performance only minimally whereas the speed with which an image is transferred to a graphics component may determine overall system performance.

The amount of global wire is a significant design constraint due to routing and signal quality considerations. In at least some circumstances, global wire may complicate routing based simply on the large number of signals that are routed throughout an integrated circuit. As a result, even though other factors urge one component layout, routing global wire may be the determining factor in having to select an alternate component layout. For example, wire length is a significant factor in determining a maximum clock rate for an integrated circuit, with shorter wire lengths corresponding to faster clock rates. If routing problems caused by global wire dictate component layout, clock rates for the integrated circuit may need to be slowed so that longer wires do not introduce timing problems.

SUMMARY OF THE INVENTION

The present invention extends to a communication method and a bus design that interconnect a plurality of components in a ring configuration with segments of the bus chaining from one component to another so as to reduce the amount of global wiring between components. One of the components serves as a beginning point and an ending point for the ring. The bus includes unidirectional signal lines that carry data objects and tags in one direction, and carry flow control information in the opposite direction. Tags accompany each data object and determine how a component interprets the data object when received by a component.

Components may control the flow of data objects in upstream bus segments using flow control. Flow control may be used to provide a component with an opportunity to satisfy a read request, to process a write request, to control upstream bus segments in response to flow control received from a downstream component, etc. For example, a component may be unable to satisfy a read request or to process a write request at the time the request is received. As noted, flow control propagates upstream, whereas data objects propagate downstream.

A bus interface may be included with each component to interface with the signal lines and identify the component. The bus design and communication method simplify overall circuit design because they allow individual components to be developed in relative isolation and integrated at a later time. Chaining components in a ring configuration significantly reduces the need for global wire. Furthermore, final component placement is dictated less by global wire constraints and may consider and account for other design parameters.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantage and features of the invention can be obtained, a more particular description of the invention briefly described above will be rendered by reference to specific embodiments thereof are illustrated in the appended drawings. Understanding that these drawings depict only typical embodiments of the invention and are not therefore to be considered as limiting its scope, the invention will be described and explained with additional specificity and detailed through the use of the accompanying drawings in which.

DETAILED DESCRIPTION OF THE INVENTION

The present invention extends to a bus design and communication method that interconnect components in a ring configuration, with segments of the bus chaining from one component to another so as to reduce the amount of global wire between components. The communication bus and method are described below with respect to a relatively low performance control bus. Although the ring configuration of the bus chaining from component to component may be well-suited for relatively low performance communication, the present invention is not limited in the type of data that may be carried or the performance required in a particular implementation. Those of skill in the art will recognize that the width of the bus may be widened or narrowed from the embodiments described below and the clock rate for the bus may be increased or decreased to meet an expansive range of communication requirements.

The embodiments of the present invention may comprise a special purpose or general purpose computer including various computer hardware, as discussed in greater detail below with respect to FIGS. 1–3. Embodiments within the scope of the present invention also may include computer-readable media for carrying or having computer-executable instructions or data structures stored thereon. Such computer-readable media may be any available media that can be accessed by a general purpose or special purpose computer. By way of example, and not limitation, such computer-readable media may comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
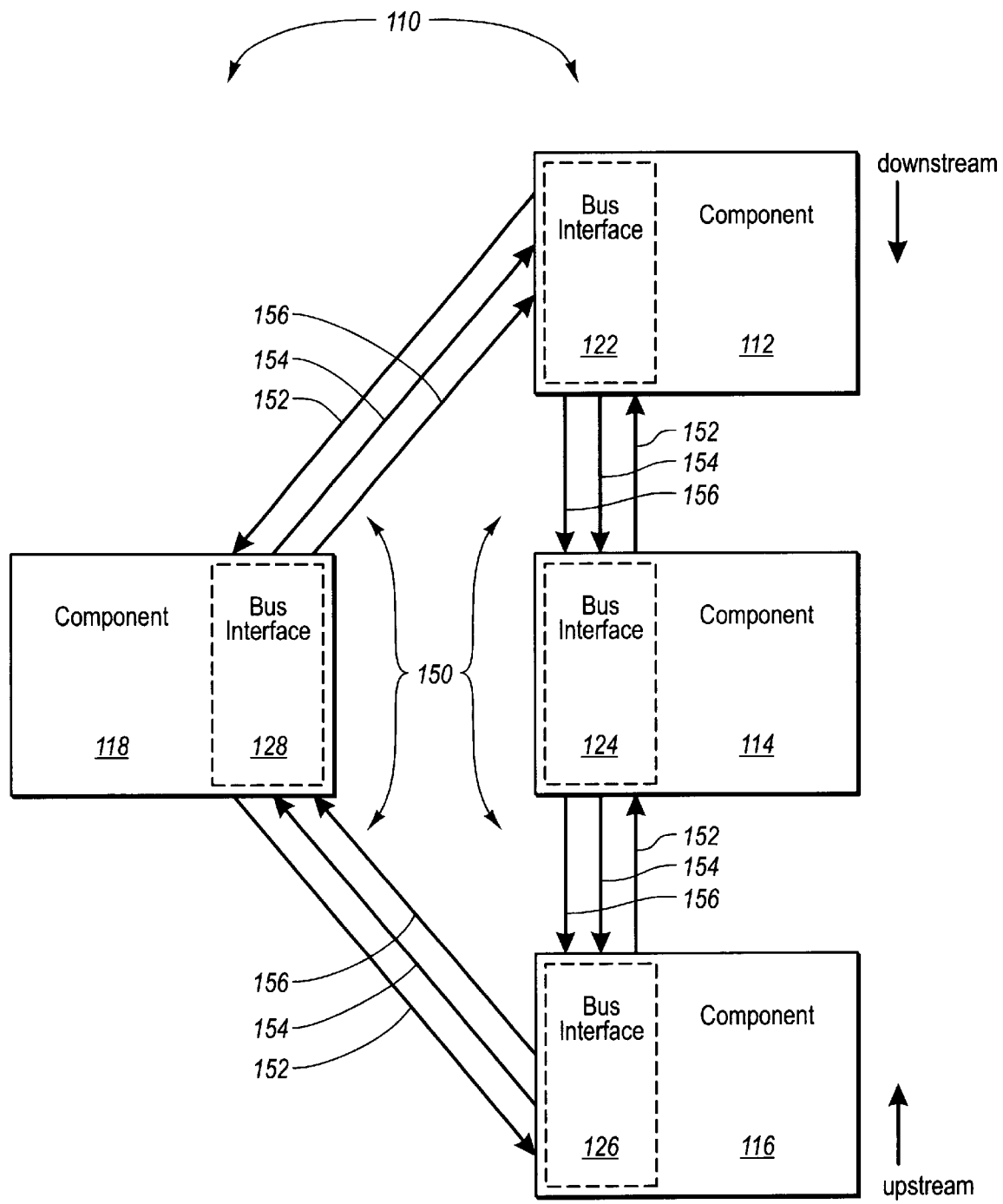
FIG. 1 is a block diagram of components interconnected with a bus according to the present invention.

Turning first to FIG. 1, a block diagram of various components 110 interconnected with a bus 150 according to the present invention is shown. Components 110 may be any type of components, such as the components of ASIC 210 illustrated and described with respect to FIG. 2. The individual components, 112, 114, 116, and 118, are in a ring configuration, with segments of bus 150 chained between them. It should be noted that "ring configuration" or "ring" as used in this application should be interpreted broadly to encompass any configuration with a common starting and ending point (usually a single component but potentially a collection of components). The present invention, therefore, is not limited to any particular component layout.

Figure 2:
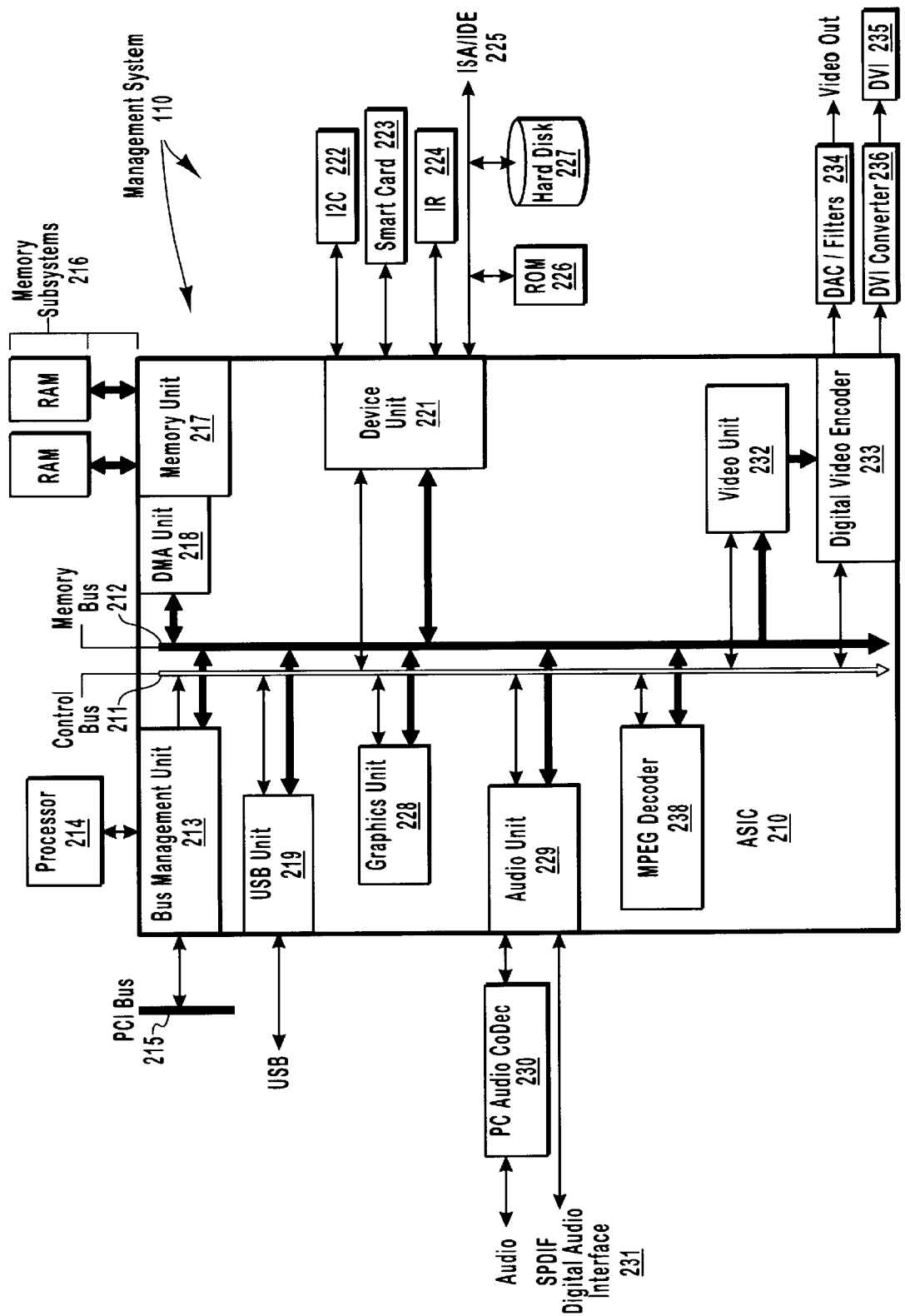
FIG. 2 illustrates an example system that provides a suitable environment for practicing the present invention.

Furthermore, although embodiments of the present invention may be described as a replacement for control bus 211 of FIG. 2, it is not necessary for components 110 to be implemented within a single integrated circuit. In some embodiments, it may be desirable to implement one or more of components 110 as separate integrated circuits or it may be desirable to implement portions of components 110 as separate integrated circuits. It should also be noted that one or more of components 110 may be connected to other buses and act as a bridge from bus 150 to those other buses. Those other buses may be any type of bus, including buses within the scope of the present invention.

Bus 150 includes various unidirectional signal lines, including a plurality of unidirectional data signal lines 154, at least one unidirectional tag signal line 156, and one or more unidirectional flow control signal lines 152. (For the embodiment shown in FIG. 3, there are eight data signal lines 354, two tag signal lines 356, and one flow control signal line 352, although the present invention is not necessarily limited to any particular number of signal lines.) Data signal lines 154 are one example of data means for providing data to components, tag signal lines 156 are one example of tag means for providing a tag to components that indicates how data provided by the data means should be interpreted, and flow control signal line 152 is one example of flow control means for controlling data flow through the data means. Note that data flows through signal lines 154 and tag signal lines 156 in a first, downstream, direction, whereas data flows though flow control signal line 152 is in a second, upstream, direction. Details regarding the signals carried in data signal lines 154, tag signal lines 156, and flow control signal line 152, are provided in FIGS. 4–7 and the corresponding discussion.

Each of components 112, 114, 116, and 118, includes a corresponding bus interface 122, 124, 126, and 128. The bus interfaces include logic for interacting with bus 150. In some circumstances, two or more of bus interfaces 122, 124, 126, and 128 may be identical or share common designs. This permits thorough testing and optimization for the bus interfaces and frees developers of components 110 from having to design their own bus interface. Furthermore, components 112 may be designed in relative isolation and then be fully integrated at a later time. Bus interfaces 122, 124, 126, and 128 are examples of bus interface means for processing data provided by and for passing data over at least one of the data means, the tag means, and the flow control means. An exemplary implementation of one bus interface is described with reference to FIG. 3.

Component 118 serves as the beginning and end of the ring configuration shown in FIG. 1. Component 118 and bus interface 128 control the overall operation of bus 150, making various read and write requests to components 112, 114, and 116, and processing the corresponding responses. Read requests, write requests, and the responses are described in detail with respect to FIGS. 4–7. The discussion of FIGS. 4–7 also includes some specific details of how the request and response processing of bus interface 128 and component 118 may differ from other bus interfaces and components. However, in many respects, the request and response processing of bus interface 128 and component 118 is similar to the request and response processing performed by bus interfaces 122, 124, and 126, and components 112, 114, and 116.

As indicated previously, components 112, 114, and 116 are connected in a unidirectional chain, with component 118 at the beginning of chain where it injects commands, addresses, and write data, and at the end of the chain where it gathers read data. Data signal lines 154 carry commands, addresses, and write data from component 118 to component 112, component 114, component 116, and back to component 118, and carry read data from components 112, 114, and 116 back to component 118. The chain is a pipeline, with a pipeline register at each of components 112, 114, and 116, so that no bus signal needs to travel further than one component-to-component hop in a single bus cycle.

Figure 4:
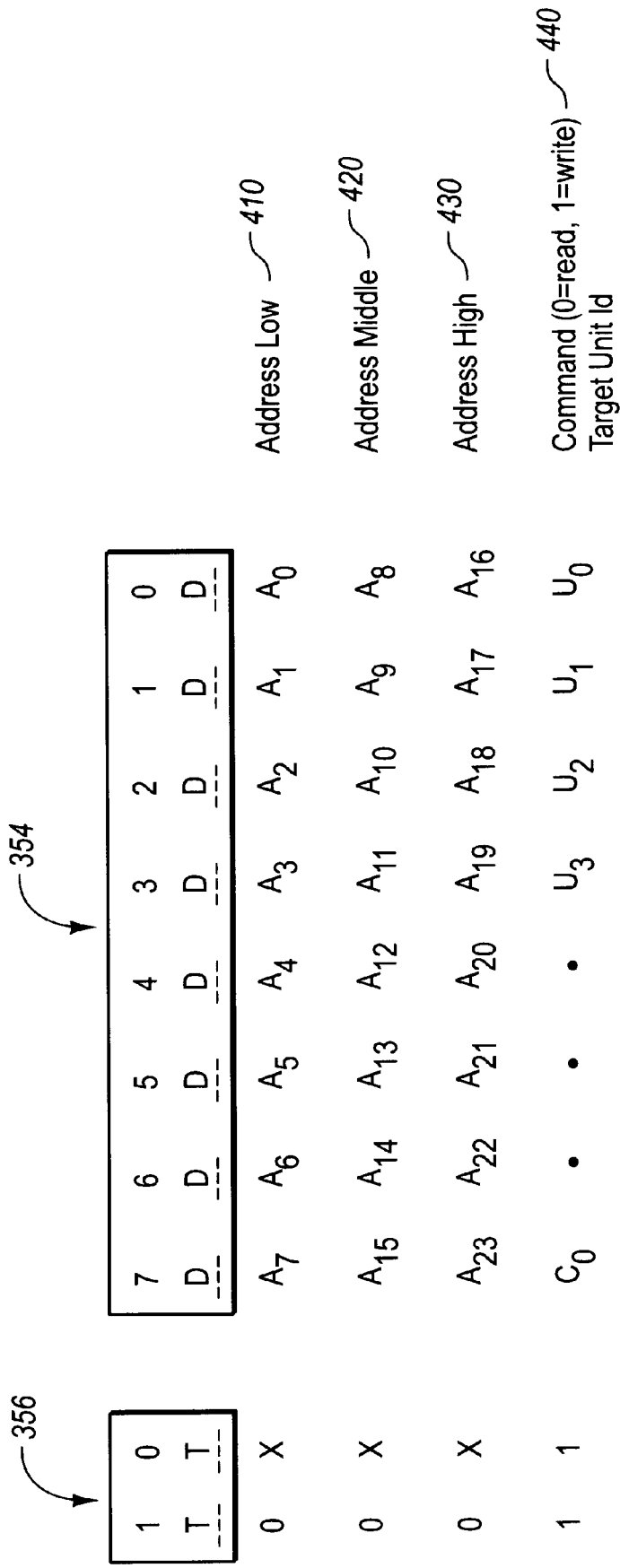
FIG. 4 shows an example address object as communicated in accordance with one embodiment of the present invention.
Figure 5:
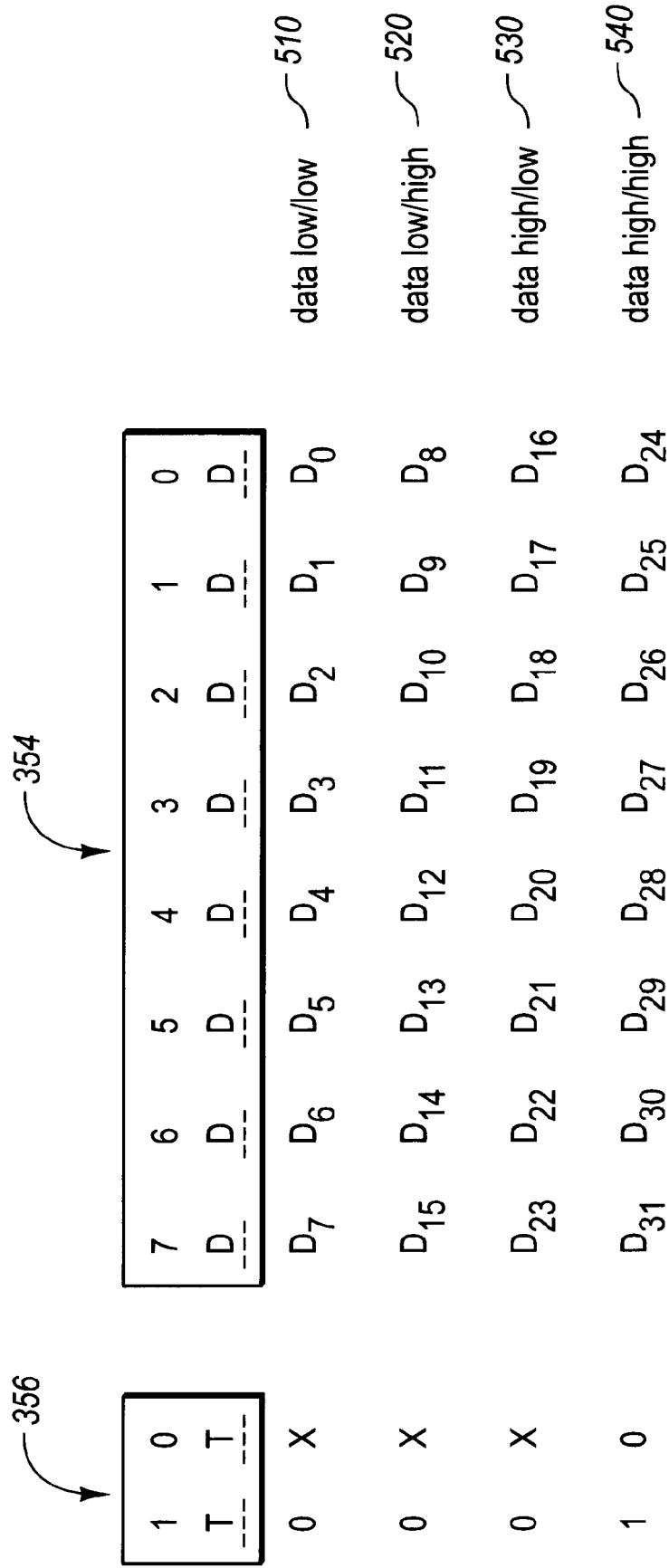
FIG. 5 shows an example data object containing data as communicated in accordance with one embodiment of the present invention.

Data objects, using data signal lines 154, and tags, using tag signal lines 156, flow downstream, from the beginning of the chain to the end of the chain. Data signal lines 154 carry address/command words and/or data words, where each address/command word and data word is four bytes long, in little-endian order (low byte first, high byte last). It should be noted, however, that the present invention does not limit data, addresses, or commands to any particular format, ordering, or size. The tag signal lines 156 carry a tag which flows down the pipeline in synchronization with the data signal lines 154, and indicate to each component how to interpret the data signal lines as they flow through the component. The tags include "00" for "nothing special," "01" for "nothing special, address claimed," "10" for "byte three of a data word," and "11" for "byte three of an address/command word." FIG. 4 illustrates one example of an address/command word with corresponding tags, and FIG. 5 illustrates one example of a data word with corresponding tags. Both FIGS. 4 and 5 will be described in greater detail below.

Flow control, using flow control signal line 156, flows upstream, from the end of the chain to the beginning of the chain. Flow control is pipelined as well, but in the opposite direction from data objects and tags. If a component receives an asserted flow control signal from downstream in a bus cycle, then the component does not advance the data/tag pipeline in that bus cycle. A component asserts its flow control signal to the upstream any time it wants to stop the upstream, such as when a downstream component has asserted its flow control, or when the component needs to stall the pipeline while it fetches some read data, or when the component needs to stall the pipeline because write data is arriving too quickly. It should be noted that there is a one cycle delay between flow control in to a component and flow control out of a component, so each component needs to be capable of accepting one more data object and tag (e.g., a 10 bit register if the data object is 8 bits and the tag is 2 bits as described below with reference to FIG. 4) when the component wants to stop the pipeline.

FIG. 2 illustrates an example application specific integrated circuit (ASIC) 210 that processes video and other data, suitable for practicing the present invention. Of course, the present invention may be practiced in a variety of environments and is in no way limited to the specific example shown in FIG. 2. The ASIC 210 includes a number of components that communicate over a control bus 211 and a memory bus 212. The control bus 211 carries relatively low bandwidth control information that controls the operation of each of the components of the ASIC 210. As explained above and as shown in FIG. 2, control bus 211 uses global wire to interconnect the various components of ASIC 210. FIG. 3 illustrates an example implementation of a bus according to the present invention that may be substituted for control bus 211 and will be described in more detail below. It should be noted, however, that the present invention is not limited in any degree to carrying relatively low bandwidth information. The memory bus 212 carries higher bandwidth information such as video information between each of the components of the ASIC 210 and memory. A bus management unit 213 manages the communication over the control bus 211 and also interfaces with a processor 214 and a PCI bus 215.

The processor 214 oversees the general video processing by dispatching instructions over the control bus 211 instructing the various components of the ASIC 210 to perform their specialized tasks. The processor 214 also monitors the progress of such tasks, thus controlling the various components of ASIC 210 in a coordinated fashion. The processor 214 may be any processor capable of performing such oversight functions including a MIPS or X86 architecture processor.

Of course, memory is required to perform such coordinated operations. Accordingly, the ASIC 210 has access to one or more memory subsystems 216 which provide volatile memory that is shared between the components of the ASIC 210. The memory subsystems 216 may be any memory subsystem that allows for rapid access to stored information. For example, the memory subsystems 216 may be DDR or SDRAM. Each of the components of the ASIC 210 will now be described.

A memory unit 217 communicates directly with the memory subsystems 216. The memory unit 217 is more efficient if there are large, less frequent, and less regular accesses to the memory subsystems 216. However, many of the components of the ASIC 210 may operate most efficiently when there are smaller, but more frequent, and more regular memory transactions. The direct memory access ("DMA") unit 218 acts as a buffering interface such that the components may have small, frequent, and regular transactions with the DMA unit 218, while leaving it up to the DMA unit 218 to bundle the smaller transactions into larger, less frequent, and less regular transactions for the memory unit 217 to conduct with the memory subsystems 216. In this manner, when a component needs to access the memory subsystems 216, the component either communicates directly with the memory unit 217 or communicates through the DMA unit 218 depending on the nature of the transaction.

A universal serial bus ("USB") interface 219 is capable of running a universal serial bus. The USB unit 219 may be any conventional USB interface with the additional requirement that it interface with the control bus 211 and the memory bus 212.

A device unit 221 includes interfaces for a number of miscellaneous devices. For example, the device unit 221 contains a bi-directional interface for an I2C bus 222 for communication with external components, a bi-directional interface for a smart card 223, a bi-directional infra red ("IR") serial interface 224, and a bi-directional ISA/IDE bus 225 that interfaces with a read only memory 226 and a hard disk drive 227 as well as a number of other devices such as a DVD-ROM drive.

A graphics unit 228 comprises a 3-D graphic rendering engine that may be, for example, an eight million polygon DirectX7 compatible 3-D graphics unit.

An audio unit 229 drives a PC audio interface 230 such as an AC'97 audio interface that may received or transmit audio. The audio unit 229 may also drive other audio interfaces including a digital interface such as SPDIF digital audio interface 231.

A video unit 232 receives video data from the memory bus 212 and converts the video data into a digital display. The video unit 232 handles multiple windows of video data and may operate in the RGB or YGB color formats as needed. The video unit 232 provides the digital display data to the digital video encoder 233 which converts the digital display data into the desired format (e.g., NTSC or HDTV) and provides the digital video through a digital to analog converter ("DAC") and filter 234 to a composite, S-Video or component output. The digital video encoder 233 may also output the video to a digital video interface ("DVI") 235 using a DVI converter 236.

An MPEG decoder 238 is provided to decode MPEG streams. The MPEG decoder also performs subsample decoding by reducing the frame size of the resulting decoded frame.

While FIG. 2 and the corresponding discussion above provide a general description of a suitable environment in which the invention may be implemented, it will be appreciated that the features of the present invention may be practiced in association with a wide variety of different system configurations.

Figure 3:
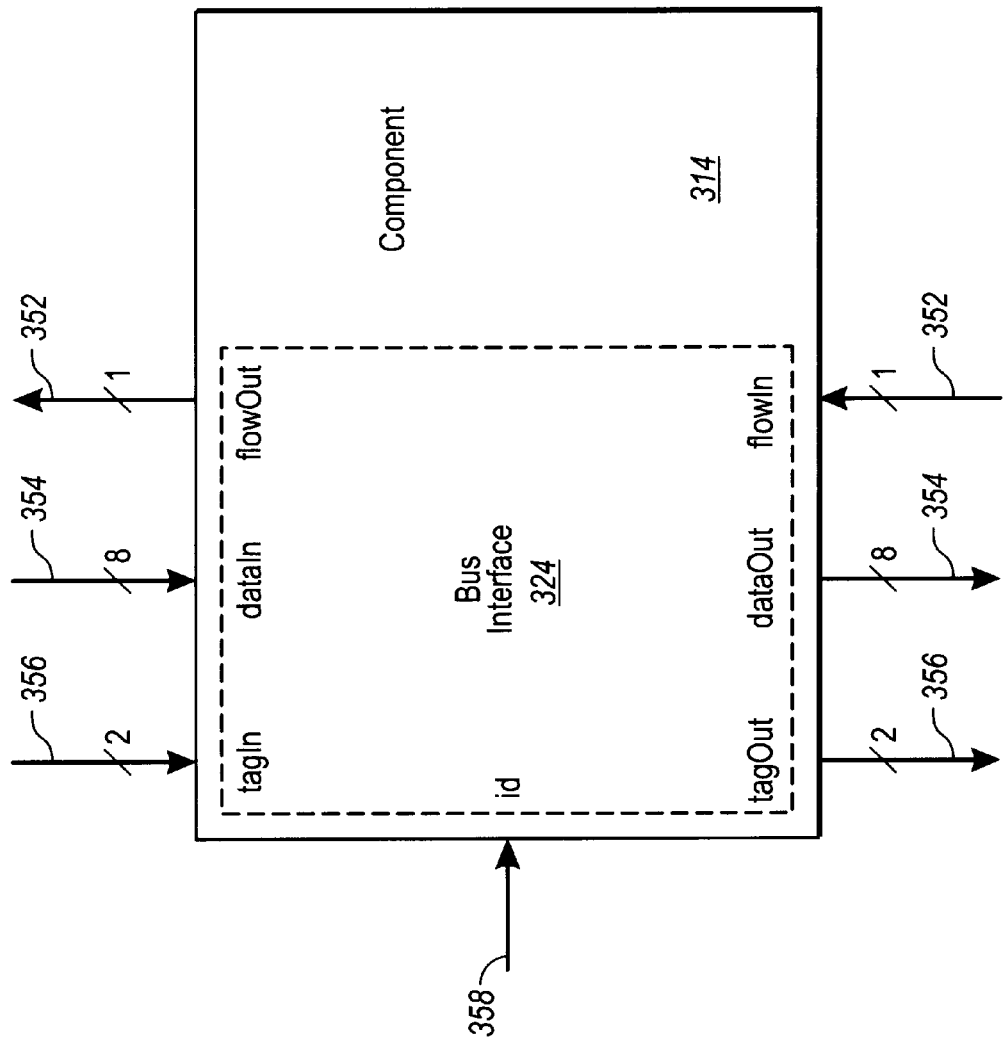
FIG. 3 is a block diagram providing greater detail for one of the interconnected components shown in FIG. 1.

FIG. 3 is a block diagram providing more specific detail for an example component 314 and bus interface 324 that are similar to those shown in FIG. 1. Bus interface 324 receives data signal lines 354, collectively identified as dataIn, tag signal lines 356, collectively identified as tagIn, flow control signal line 352, identified as flowIn, and component identifier signal lines 358, identified as id. Likewise, bus interface 324 sets data signal lines 354, collective identified as dataOut, tag signal lines 356, collectively identified as tagOut, and flow control signal line 352, identified as flowOut. The identifying names, dataIn, tagIn, flowIn, dataOut, tagOut, and flowOut are used in the description of read and write operations illustrated in FIGS. 6 and 7.

Configurable id signal lines 358 are used to configure the target component or unit identifier for a component. As noted previously, this allows components to be developed in isolation and then integrated at some later time. If the target component identifier needs to be modified for one or more components during development, the configurable id signal 358 may be changed accordingly with relatively minimal impact to the overall project. Configurable id signal lines 358 are one example of component identifier means for identifying each of a plurality of components. Use of the target component id is described with respect to FIG. 4, below. Configurable id 358 may not be present in all bus interfaces. For example, a component such as component 318 that serves as the beginning and end of the chain may have no need to direct read and write requests to itself over bus 350 and therefore have no need for a configurable id.

Reading from and writing to a component begin with an address/command sequence that is illustrated in FIG. 4. Sixteen separate components are allowed in this example, each with an address space of up to sixty-four megabytes (assuming four bytes are associated with each address). Naturally, the present invention is not limited to any particular number of components or corresponding address space. The bits for the two tag signal lines 356 are identified with a "T" and numbered 0–1. Similarly, the bits for the data signal lines 354 are identified with a "D" and numbered 0–7. The low address bits 410 are sent first, with a tag of "0X" where the "X" is a "don't care" indicator. As noted above, a zero in the first position indicates either than the data is nothing special or is nothing special with the address having been claimed. The middle address bits 420 and high address bits 430 are sent next, also with "0X" tags for a total of twenty-four address bits, numbered 0–23.

At the end of the address/command sequence, a command and target unit or target component id 440 are sent with a "11" tag to indicate byte three of an address command word, where the four bytes are numbered zero through three. A zero in the command bit indicates a read operation and a one in the command bit indicates a write operation. Of course, the number of supported commands may be increased by increasing the number of command bits. The four target component id bits are examined by each component to determine if the address/command sequence is directed to the component. The target component id bits correspond to the configurable id signal 358 of FIG. 3.

The data sequence shown in FIG. 5 is analogous to the address/command sequence of FIG. 4. Bits for the two tag signal lines 356 are identified with a "T" and numbered 0–1, whereas bits for the data signal lines 354 are identified with a "D" and numbered 0–7. It should be noted that the present invention is not limited to using the same data signal lines 354 for both address/command words and data words. In some implementations, it may be preferable to separate address/command words from data words. In this exemplary implementation of the present invention, data words are thirty-two bits, numbered 0–31. The low/low 510, low/high 520, and high/low 530 bytes are all sent with a "0X" tag. The high/high data byte 540 is sent with a "10" tag to indicate byte three of a data word, where the four bytes are numbered zero to three.

A component begins reading when it receives data with a "11" tag (byte three of an address word), the correct component id, and a "0" command. (A read operation will be described in detail with respect to FIG. 6, below.) While fetching the requested data, the upstream is stalled and the client sends "0X" tagged data downstream. Once the data has been fetched, the component sends the data downstream, with bytes two, one, and zero tagged "0X" and byte three "10" tagged. The component clears its upstream flow control at the appropriate time to restart the upstream pipeline smoothly. The component sets the tag in the bus cycle immediately after the address/command to "01" as an indication that the read request has been claimed.

When the component at the extreme downstream end of the chain eventually receives the address/command back, it examines the tag in the next bus cycle to determine if the read request was claimed by some other component. If no component claims the read command, the end component can perform whatever processing is necessary, such as generating an error. If a component claims the read request, the end component waits for the requested data by watching for a "10" tag. There are a variable number of cycles between the end component receiving the address/command and the data, depending on the latency of the component that performs the read command.

Figure 6:
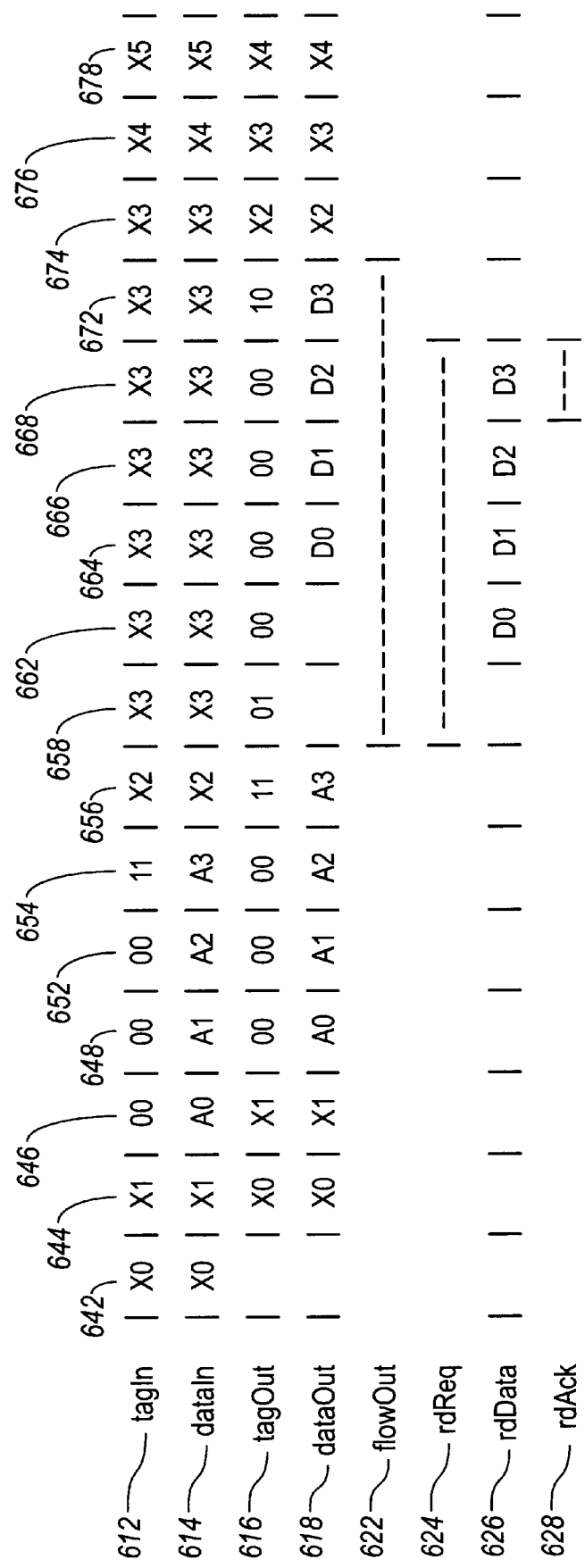
FIG. 6 illustrates a read operation at a component interconnected with a bus practicing the present invention.

The bus cycles for a read operation performed by a component are illustrated in FIG. 6. Signal names are arranged vertically and numbered from 612–628, whereas bus cycles are arrange horizontally and numbered from 642–678. Some of the signal names are identified in FIG. 3 and others are internal to a component and will be described as needed. Specifically, tagIn 612 and tagOut 616 correspond to tag signal lines, dataIn 614 and dataOut 618 correspond to data signal lines, and flowOut 622 correspond to the flow control signal line. A flowIn signal is not described because it is assumed that no downstream component asserts flow control during the read operation. The rdReq 624 signal identifies that a read is pending, rdData 626 is the data read, and rdAck 628 indicates that the last byte of the read data will be set on dataOut during the next bus cycle.

In FIG. 6, tagIn and tagOut are two bit values, whereas dataIn, dataOut, and rdData are eight bit values. Letter prefixes are often used to indicate the type of data a signal contains and the number following a letter prefix indicates the sequence of the data. An "X" prefix indicates arbitrary data of appropriate length for the corresponding signal. Likewise, a "D" prefix specifies a data signal and an "A" prefix specifies an address/command signal. For example, "X0" at bus cycle 642 represents an initial arbitrary two bit value for tagIn and an initial arbitrary eight bit value for dataIn. Similarly, "X1" at bus cycle 644 represents a subsequent arbitrary two bit value for tagIn and a subsequent arbitrary eight bit value for dataIn.

During bus cycle 642, the component receives "X0" at tagIn and "X0" at dataIn. All remaining signals are unknown at this point. During the next bus cycle 644, tagIn is "X1," dataIn is "X1," and the component sets tagOut to "X0" and dataOut to "X0," the values received in the previous bus cycle 642. At bus cycle 646, the two bits of tagIn are "00," indicating that the first address/command byte at dataIn "A0" is nothing special. The tagOut and dataOut signals are set to the previous bus cycle values, "X1." Bus cycles 648 and 652 are analogous to bus cycle 646, with the second and third address/command bytes being received.

At bus cycle 654, tagIn is "11," indicating that "A3" at dataIn is byte three of an address/command word. As with prior bus cycles, tagOut and dataOut are set to the values received during the previous bus cycle. The component receives "X2" at tagIn and dataIn during bus cycle 656, and again sets tagOut and dataOut to the values received in the previous bus cycle. Beginning with bus cycle 658, the component assert rdReq and flowOut in response to having received the read request. "X3" is received at tagIn and dataIn, but tagOut is set to "01" to indicate that the component claimed the read request.

By asserting flow control (i.e., asserting flowOut) during bus cycles 658–672, "X3" (i.e., the same arbitrary value) is received at tagIn and dataIn through bus cycle 674 since the flow control stalls upstream data flow. At bus cycle 662, the component sets tagOut to "00" and reads "D0," the first byte of read data. During bus cycle 664–668, the component again sets tagOut to "00," but sets dataOut to the byte of read data that was read in the previous bus cycle and reads the second, third, and fourth bytes of read data. Having read the fourth byte of read data, rdAck is asserted for one bus cycle to indicate that dataOut will be set to the last byte of read data in the next bus cycle. At bus cycle 672, tagOut is set to "10" to indicate that dataOut is set to byte three "D3" of a data word, and rdReq is cleared because the read request is no longer pending.

During bus cycle 674, tagIn and dataIn continue to be set to "X3" because it takes one bus cycle to restart an upstream bus segment after the segment is stalled. However, the component is able to set tagOut and dataOut to "X2," the values received during bus cycle 656, because new values will begin to flow with the next bus cycle. For bus cycles 676 and 678, tagIn and dataIn receive new values, "X4" and "X5," and tagOut and dataOut are set to the values received during the previous bus cycle.

Similar to the read operation described above, a component begins writing when it receives data with a "11" tag (byte three of an address word), the correct component id, and a "1" command. (A write operation will be described in detail with respect to FIG. 7, below.) The write data follows during the next four bus cycles. (In some circumstances it may be necessary to insert stall cycles between the address/command and the write data.) If the component is unable to handle the write data, it asserts its upstream flow control to stall the upstream (which in turn stalls the write data), until the component is able to handle the write data. The component sets the tag in the bus cycle immediately after the address/command to "01" as an indication that the write request has been claimed.

When the component at the extreme downstream end of the chain eventually receives the address/command back, it examines the tag in the next bus cycle to determine if the write request was claimed by some other component. If no component claims the write command, the end component can perform whatever processing is necessary, such as generating an error. The write data is ignored. It should be noted that the write data is not guaranteed to be back-to-back with the address/command once the write command passes the component to which it is directed due to the possibility of a subsequent stall.

Figure 7:
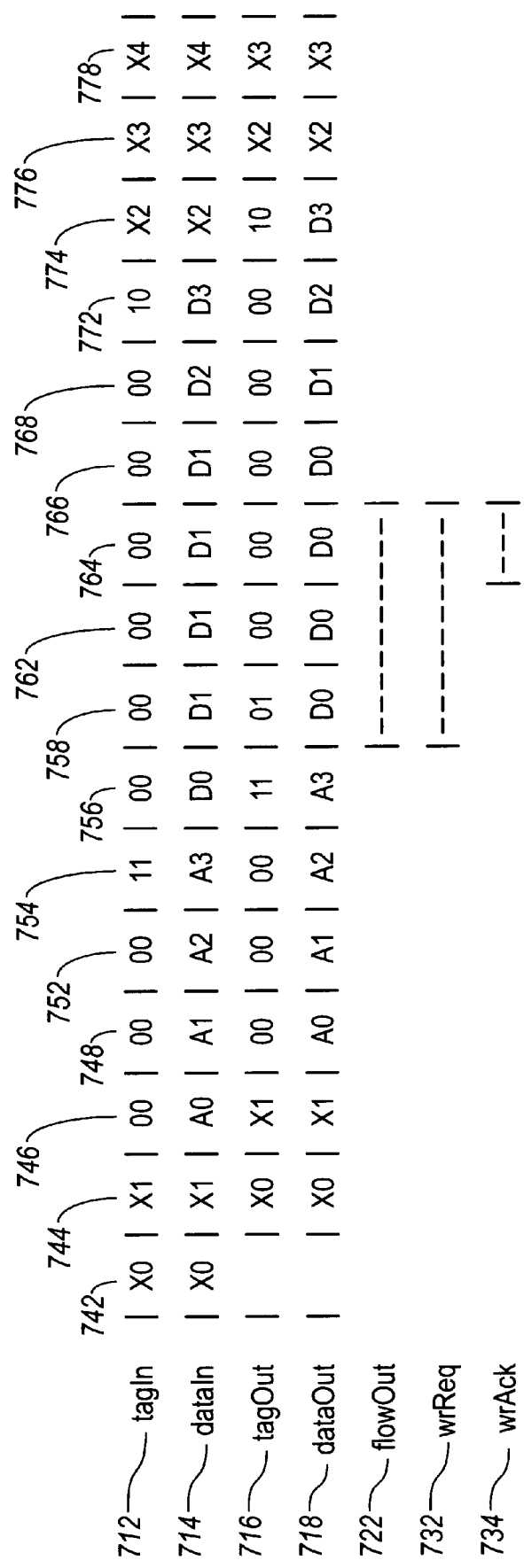
FIG. 7 illustrates a write operation at a component interconnected with a bus practicing the present invention.
Figure 8A:
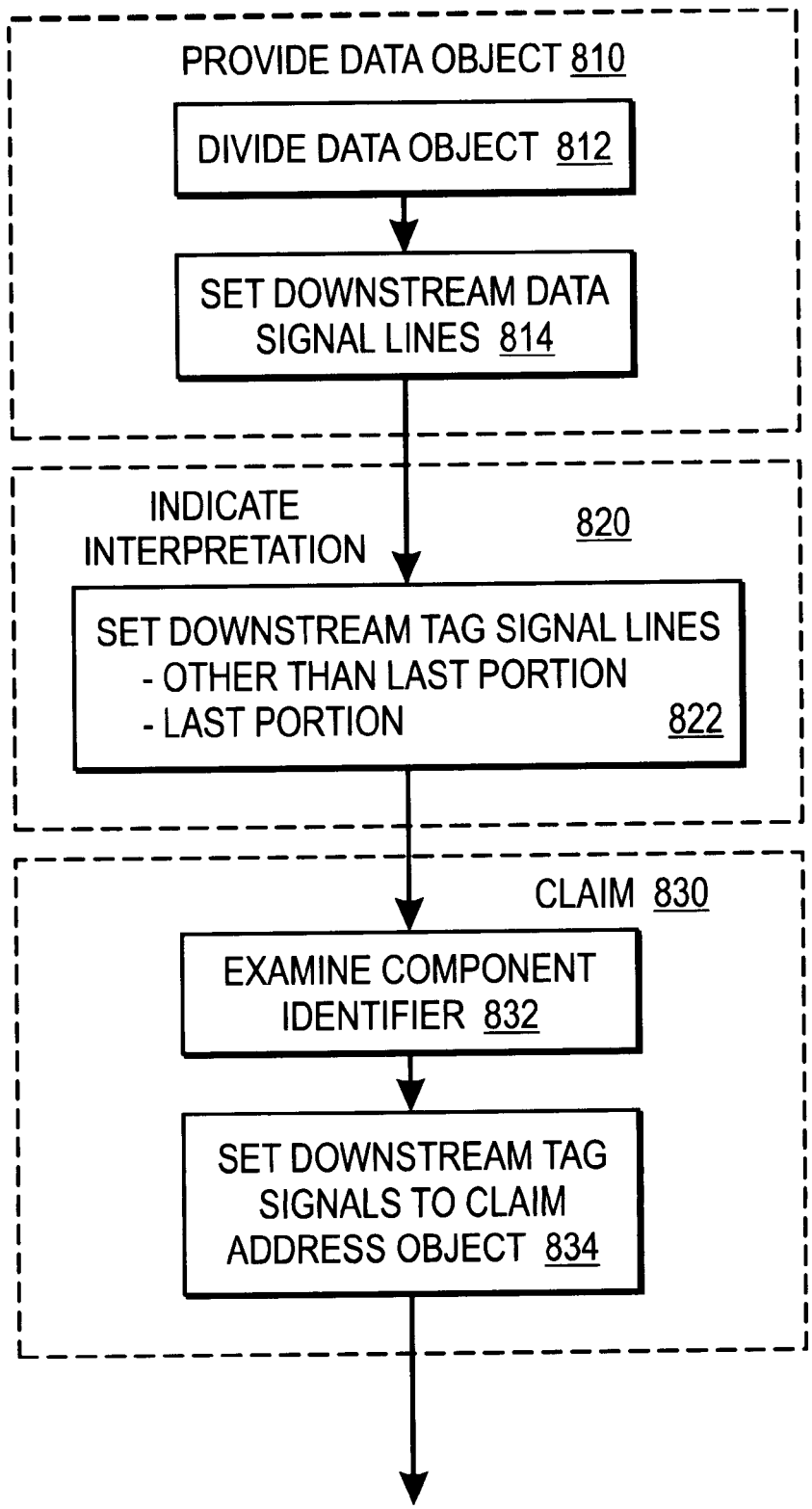
FIGS. 8A–8D are a flow diagram of a method that includes functional steps and/or non-functional acts in accordance with the present invention.
Figure 8B:
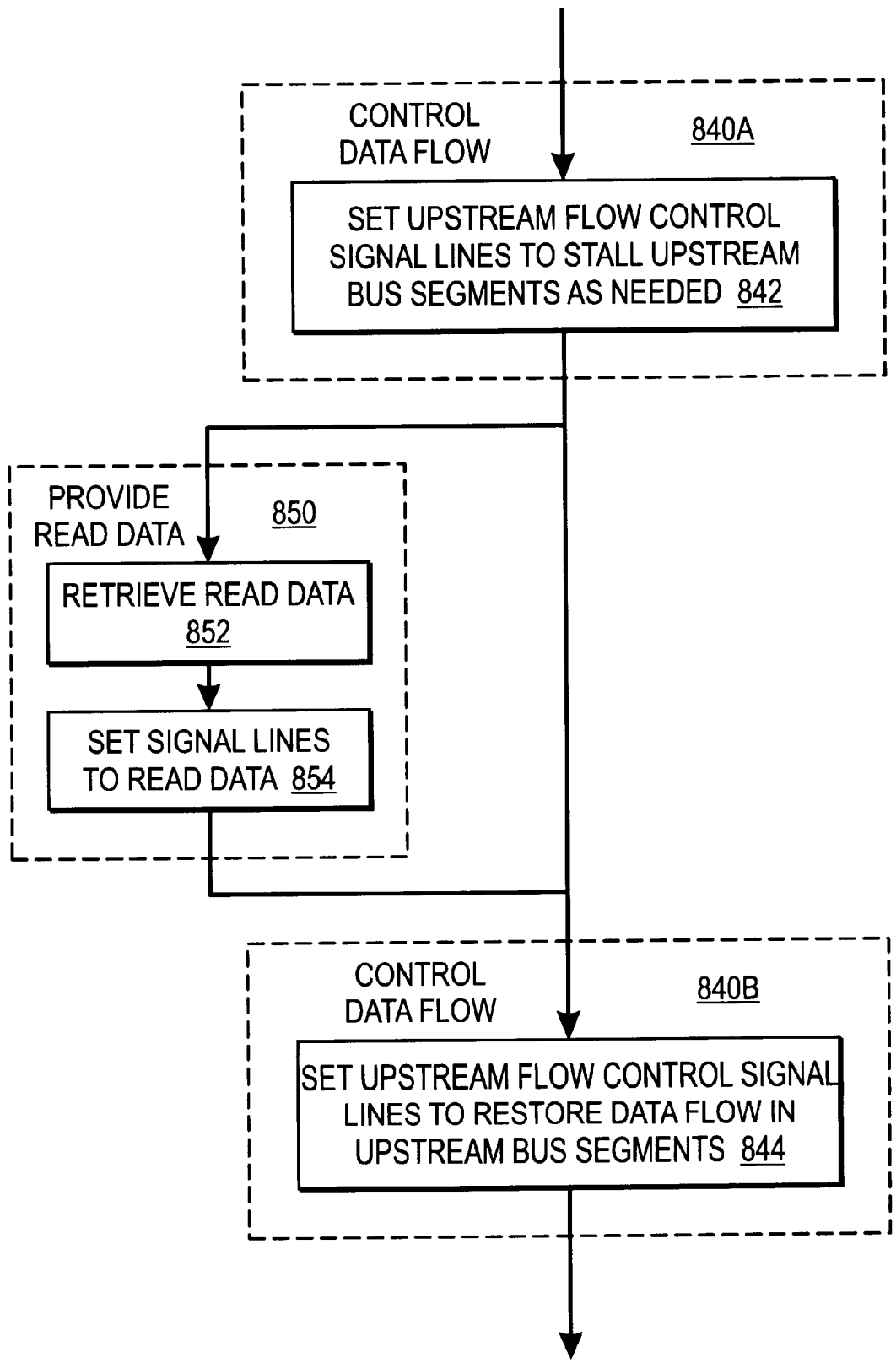
Figure 8C:
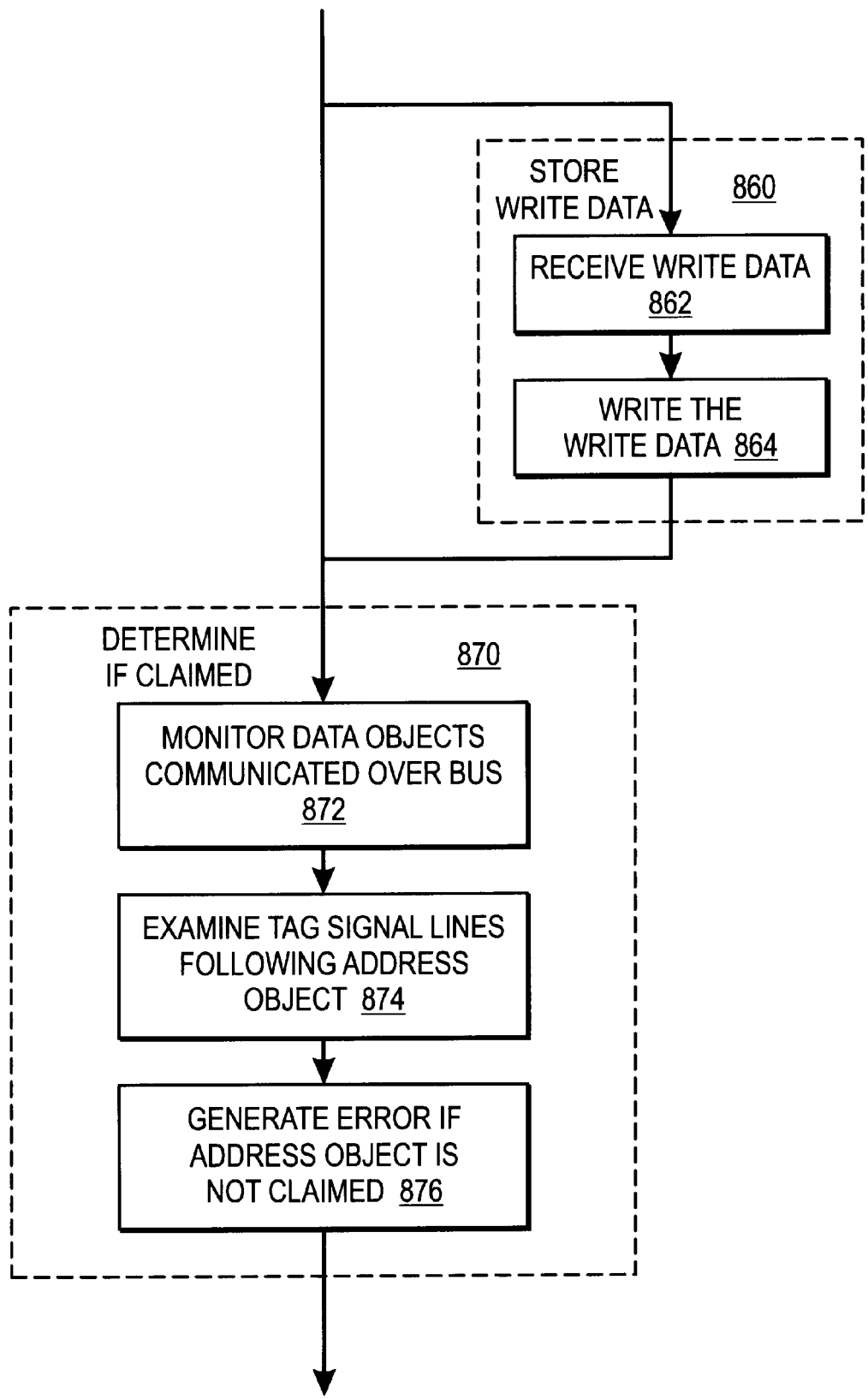
Figure 8D:
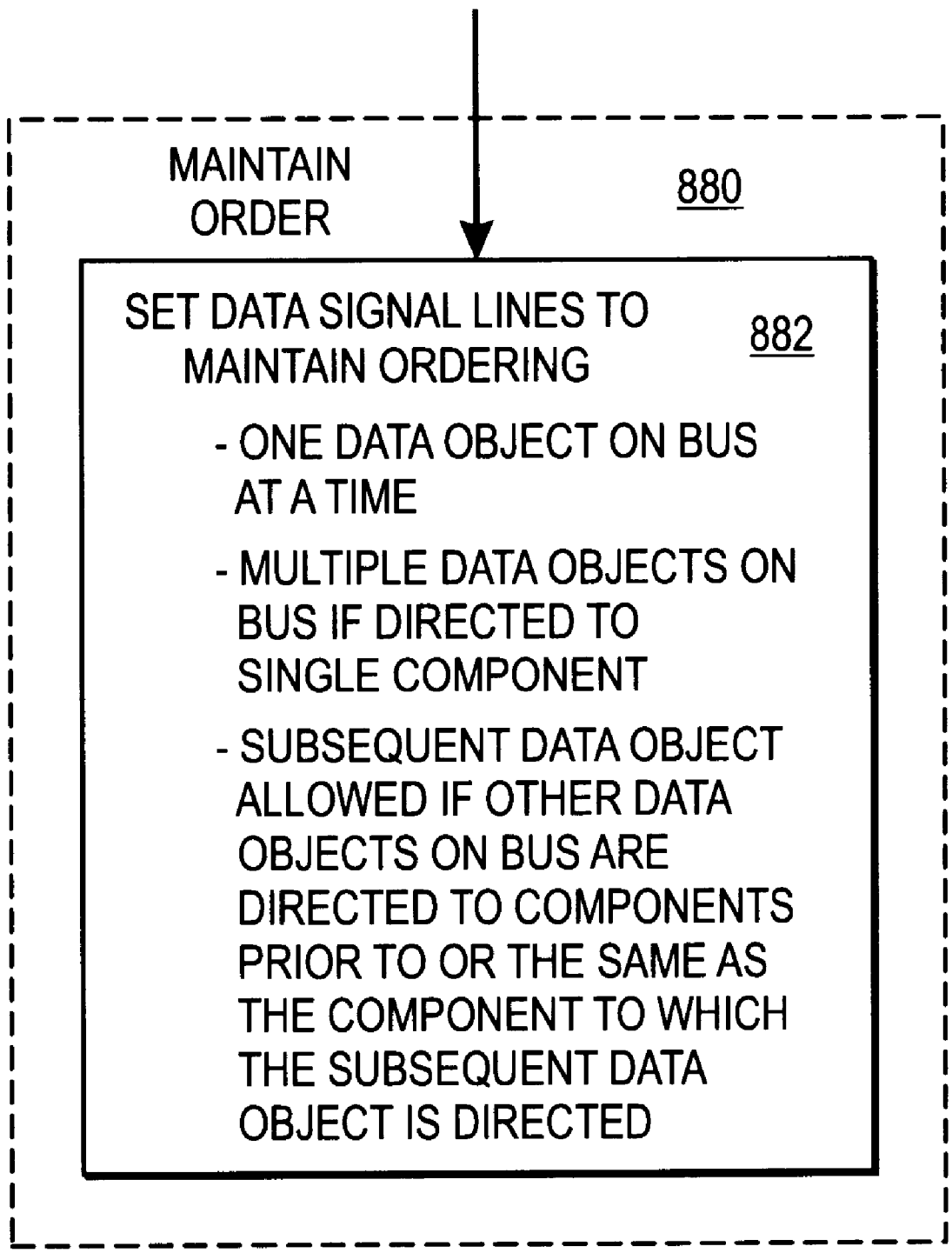

The bus cycles for a write operation performed by a component are illustrated in FIG. 7. Similar to the read operation shown in FIG. 6, signal names are arranged vertically and numbered from 712–734, whereas bus cycles are arrange horizontally and numbered from 742–778. Some of the signal names are identified in FIG. 3 and others are internal to a component and will be described as needed. Specifically, tagIn 712 and tagOut 716 correspond to tag signal lines, dataIn 714 and dataOut 718 correspond to data signal lines, and flowOut 722 corresponds to the flow control signal line. A flowIn signal is not described because it is assumed that no downstream component asserts flow control during the write operation. The wrReq 732 signal indicates that a write is pending and wrAck 734 indicates that the component is ready for additional write data on the next bus cycle.

FIG. 7 is similar to FIG. 6 in that tagIn and tagOut are two bit values, whereas dataIn and dataOut are eight bit values. Letter prefixes are often used to indicate the type of data a signal contains and the number following a letter prefix indicates the sequence of the data. An "X" prefix indicates arbitrary data of appropriate length for the corresponding signal. Likewise, a "D" prefix specifies a data signal and an "A" prefix specifies an address/command signal. For example, "X0" at bus cycle 742 represents an initial arbitrary two bit value for tagIn and an initial arbitrary eight bit value for dataIn. Similarly, "X1" at bus cycle 744 represents a subsequent arbitrary two bit value for tagIn and a subsequent arbitrary eight bit value for dataIn.

Bus cycles 742–754 are similar to bus cycles 642–654 of FIG. 6. During bus cycle 742, the component receives "X0" at tagIn and "X0" at dataIn. All remaining signals are unknown at this point. During the next bus cycle 744, tagIn is "X1," dataIn is "X1," and the component sets tagOut and dataOut to "X0," the values received in the previous bus cycle 742. At bus cycle 746, tagIn is "00," indicating that the first address/command byte at dataIn "A0" is nothing special. The tagOut and dataOut signals are set to the previous bus cycle values, "X1." Bus cycles 748 and 752 are analogous to bus cycle 746, with the second and third address/command bytes being received.

At bus cycle 754, tagIn is "11," indicating that "A3" at dataIn is byte three of an address/command byte. As with prior bus cycles, tagOut and dataOut are set to the values received during the previous bus cycle. The component receives "00" at tagIn and "D0" at dataIn during bus cycle 756, and again sets tagOut and dataOut to the values received in the previous bus cycle. Beginning with bus cycle 758, the component assert wrReq and flowOut in response to having received the write request. (If the component is able to handle write data immediately, it may be unnecessary to assert flowOut.) "00" is received at tagIn and "D1" at dataIn, but tagOut is set to "01" to indicate that the component claimed the write request. The component sets dataOut to the "D0" received at dataIn during the previous bus cycle. Bus cycles 762–766 represent stall cycles where the same information is at tagIn, dataIn, tagOut, and dataOut. When the component is ready to handle the write data in bus cycle 764, wrAck is asserted for one bus cycle, and flowOut and wrReq are cleared.

In bus cycle 768, tagIn is "00" and dataIn is "D2," tagOut and dataOut are set to the values received in the previous bus cycle. During bus cycle 772, tagIn is "10," indicating byte three of a data word, and dataIn is "D3," the last byte of the data word. Again, tagOut and dataOut are set to the values received in the previous bus cycle. For the remaining bus cycles 774–778, tagIn and dataIn receive "X2," "X3," and "X4," and tagOut and dataOut are set to the values received in the previous bus cycle. The component writes the data word at the address specified in the address/command word after the data is received.

Note that although commands flow down the pipe in the order they were placed into the pipeline by the component that begins the ring configuration (read data is delivered in this order as well), there is no guarantee that if an operation "A" is issued to the pipe and an operation "B" is issued to the pipe, that operation A will be performed at the component to which it is directed before operation B is performed at the component to which it is directed, for any arbitrary operations A and B. Ordering restrictions, therefore, may be established by the beginning component, by instructions issued to the beginning component, and/or by some combination thereof. Those of skill in the art will recognize that the pipe has a substantial amount of built-in buffering, and it may be useful to have rather weak ordering in some implementations so that the buffering can be used.

Strong ordering can be maintained by implementing any of the following rules, in increasing order of performance and complexity. First, allow only one operation to be in the pipe at once. Second, allow multiple operations to be in the pipe at once if they are aimed at the same component. Third, allow multiple operations to be in the pipe at once, only if the issuing order is such that a new operation is not issued to the pipe unless all operations in the pipe are to components that are before or the same as the component to which the new operation is directed. In other words, a new operation may be added to the pipe if it is directed to a component that is the same as or after the component to which any pending operation is directed. Note that these criteria may be completely implemented in the beginning component. Other components operate the same regardless of ordering criteria and exploit whatever parallelism the beginning component allows.

An example pseudo-code implementation for the bus and communication method is presented below. The rdReq/rdAck and wrReq/wrAck signals are shown in FIGS. 6 and 7. There are five registers, designated as reg[0..4]. Reg[3] is the pipeline register for the component. Reg[2..0] hold the three data items that appear on the bus prior to the data item in reg[4]. Reg[4] is the register needed to hold the next data/tag which can't be stopped as this component is passing a stall request from downstream to upstream. Reg[4..3] are ten bit registers (eight bits for the data signal lines and two bits for the tag signal lines). Reg[2..0] are eight bit registers (data signal lines). In a name, ".d" is the data input and ".en" is the clock enable.

```
reg[4].tag.d = tagIn
reg[4].data.d = dataIn
reg[4].en = !stall
if (rdwr)
    reg[3].tag.d = 01
else if (rdReq & !rdAck)
    reg[3].tag.d = 00
else if (rdReq & rdAck)
    reg[3].tag.d = 10
else if (stall)
    reg[3].tag.d = reg[4].tag
else
```

-continued

```
    reg[3].tag.d = tagIn
if (rdReq)
    reg[3].data.d = rdDataIn
else if (stall)
    reg[3].data.d = reg[4].data
else
    reg[3].data.d = dataIn
reg[3].en = !flowIn
reg[2].data.d = reg[3].data
reg[2].en = !flowIn
reg[1].data.d = reg[2].data
reg[1].en = !flowIn
reg[0].data.d = reg[1].data
reg[0].en = !flowIn
rdwr = reg[3].tag==11 & reg[3].data.unit==MyUnit
rd = rdwr & reg[3].data.cmd==0
wr = rdwr & reg[3].data.cmd==1
stall.d =
    flowIn                          // inbound stall
  | rdwr & !flowIn                  // rd/wr go, no stall
  | rdReq                           // rd hold
  | wrReq & !wrAck                  // wr hold
rdReq.d =
    rd & !flowIn                    // rd go, no stall
  | rdReq & flowIn                  // rd hold, stall
  | rdReq & !flowIn & !rdAck        // rd hold, no stall, no ack
wrReq.d =
    wr & !flowIn                    // wr go, no stall
  | wrReq & flowIn                  // wr hold, stall
  | wrReq & !flowIn & !wrAck        // wr hold, no stall, ack
tagOut = reg[3].tag
dataOut = reg[3].data
flowOut = stall
```

The present invention also may be described in terms of methods comprising functional steps and/or non-functional acts. The following description of acts and steps that may be performed in practicing the present invention, correspond to FIGS. 8A–8D. Usually, functional steps describe the invention from a perspective of results that are accomplished, whereas non-functional acts describe more specific actions for achieving a particular result. In some circumstances, several acts may be combined to achieve the results of a particular step. Although the functional steps and non-functional acts may be described or claimed in a particular order, the present invention is not necessarily limited to any particular ordering of the acts and/or steps.

A step for providing (810) at least a portion of one or more data objects to one or more downstream components may include an act of dividing (812) a data object into a plurality of portions and an act of setting (814) a plurality of unidirectional data signal lines in a downstream direction to include at least a portion of one or more data objects. It may be necessary to divide a data object if the data object is wider than the plurality of data signal lines. For example, a thirty-two bit data object and a thirty-two bit address object would each be divided into four portions if sent over eight-bit data signal lines.

A step for indicating (820) how the at least a portion of one or more data objects should be interpreted when processed may include an act of setting (822) at least one unidirectional tag signal line in a downstream direction, wherein the at least one tag signal line indicates when the plurality of data signal lines are set with a last portion of the one or more data objects. For example, if a data object is divided, the at least one tag signal line may be set one way for portions of the data object that are other than the last portion and set another way for the last portion of the data object. By identifying the last portion, previous portions may be combined to recover the complete data object.

A step for claiming (830) an address object may include an act of examining (832) a component identifier portion of the address object to determine that the address object is directed to the component and an act of setting (834) the at least one tag signal line to indicate that the component has claimed the address object. Claiming an address object, as described below with reference to step 870, helps the component at the beginning of the bus to determine if requests are being processed properly.

A step for controlling (840A and 840B) data flow in one or more upstream bus segments as needed may include an act of setting (842) one or more unidirectional flow control signal lines in an upstream direction over the one or more bus segments that should stall and an act of setting (844) the one or more flow control signal lines to restore data flow in the previously stalled one or more upstream bus segments. For example, one or more upstream bus segments may be stalled while retrieving read data, or if a component is not ready to receive write data.

A step for providing (850) data requested in a read operation may include acts of retrieving (852) data corresponding to an address specified in the address portion of an address object and an act of setting (854) the plurality of data signal lines in accordance with the retrieved data. As noted above, a component may stall one or more upstream bus segments while performing a read operation and then restore data flow in the stalled one or more bus segments when the read operation is complete.

At times, a component may not be prepared to handle write data, perhaps because the write data is arriving to quickly. In this case, a component may stall one or more upstream bus segments prior to a write operation and then restore data flow in the stalled one or more bus segments when the component is ready to perform the write operation. A step for storing (860) data in accordance with a write operation may include an act of receiving (862) a write data object over one or more bus cycles and an act of writing (864) at least the data portion of the write data object to an address specified in the address portion of an address object.

A step for determining (870) if an address object is claimed by any of a plurality of components may include the following acts: an act of the beginning component monitoring (872) one or more data objects communicated over the bus as the one or more data objects return; an act of examining (874) the at least one tag signal line in a bus cycle that immediately follows an indication by the at least one tag signal line that the plurality of data signal lines are set with a last portion of an address object; and an act of generating (876) an error condition if the examined at least one tag signal line fails to indicate that the address object was claimed.

A step for maintaining (880) the order of one or more data object on the bus may include an act of the beginning component setting the plurality of data signal lines according to any one of the following conditions: (i) allowing only one data object on the bus at any given time; (ii) allowing multiple data objects on the bus only if directed to a single component; or (iii) allowing a subsequent data object on the bus only if any previous data object remaining on the bus is directed to a component that is prior to or the same as the component to which the subsequent data object is directed.

In this manner, the principles of the present invention allow for a bus in a ring configuration that reduces the amount of global wire needed in communicating between components. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A bus for interconnecting a plurality of components, wherein the bus is configured as a ring with segments of the bus chaining from one component to another so as to reduce the amount of global wiring between the plurality of components, and wherein at least one component serves as a beginning and an end of the ring, the bus comprising:
   a plurality of unidirectional data signal lines connecting each of the plurality of components in the ring configuration, the data signal lines carrying data signals between components in a first direction;
   at least one unidirectional tag signal line connecting each of the plurality of components in the ring configuration, the at least one tag signal line carrying one or more tag signals between components in the first direction, wherein the at least one tag signal line indicates how the data signal lines should be interpreted when received at any of the plurality of components; and
   one or more unidirectional flow control signal lines connecting each of the plurality of components in the ring configuration, the one or more flow control signal lines carrying one or more flow control signals between components in a second direction, wherein the second direction is opposite the first direction.

2. A bus as recited in claim 1, wherein the data signal lines carry address signals, data signals, and command signals.

3. A bus as recited in claim 1, further comprising a bus interface for each of the plurality of components, wherein the bus interface for one component receives at least one of (i) the data signal lines, (ii) the at least one tag signal line, and (iii) the one or more flow control signal lines from one or more previous components in the ring, and wherein the bus interface for one component sets at least one of (i) the plurality of data signal lines, (ii) the at least one tag signal line, and (iii) the one or more flow control signal lines for one or more next components in the ring.

4. A bus as recited in claim 3, wherein the bus interface for each of the plurality of components includes one or more configurable component identifier signal lines that specify an identifier for each of the plurality of components.

5. A bus as recited in claim 3, wherein the bus interface comprises a plurality of registers that receive and process the plurality of data signal lines, the at least one tag signal line, and the one or more flow control signal lines from a previous component in the ring.

6. A bus as recited in claim 3, wherein two or more components share a common implementation of the bus interface.

7. A bus as recited in claim 1, wherein at least one of the components is a bus controller for a separate bus.

8. A bus as recited in claim 1, wherein the plurality of components are implemented within a single integrated circuit.

9. A bus as recited in claim 1, wherein the bus comprises eight data signal lines, two tag signal lines, and one flow control signal line.

10. A bus as recited in claim 1, wherein the plurality of components comprises at least one of a processor, a bus management unit, an MPEG decoder, a direct memory access unit, a graphics unit, a device unit, and a video unit.

11. A bus for interconnecting a plurality of components, wherein the bus is configured as a ring with segments of the bus chaining from one component to another so as to reduce the amount of global wiring between the plurality of components, and wherein at least one component serves as a beginning and an end of the ring, the bus comprising:

data means, connected to each of the plurality of components in the ring, for providing data to components, wherein the data means operates in a first direction;

tag means, connected to each of the plurality of components in the ring, for providing a tag to components, wherein the tag means operates in the first direction, and wherein the tag indicates how data provided by the data means should be interpreted when processed at any of the plurality of components; and flow control means, connected to each of the plurality of components in the ring, for controlling data flow through the data means, wherein the flow control means operates in a second direction, and wherein the second direction is opposite the first direction.

12. A bus as recited in claim 11, wherein the data means provides address signals, data signals, and command signals.

13. A bus as recited in claim 11, further comprising a bus interface means for processing data provided by at least one of the data means, the tag means, and the flow control means from one or more previous components in the ring, wherein each of the plurality of components has a separate bus interface means.

14. A bus as recited in claim 13, further comprising bus interface means for passing data over at least one of the data means, the tag means, and the flow control means to one or more next components in the ring.

15. A bus as recited in claim 13, wherein the bus interface means comprises component identifier means for identifying each of the plurality of components.

16. A bus as recited in claim 13, wherein the bus interface means comprises a plurality of registers for processing data provided by at least one of the data means, the tag means, and the flow control means.

17. A bus as recited in claim 11, wherein the plurality of components are implemented within a single integrated circuit.

18. A bus as recited in claim 11, wherein the data means comprises eight unidirectional data signal lines, the tag means comprises two unidirectional tag signal lines, and the flow control means comprises one unidirectional flow control signal line.

19. A bus as recited in claim 11, wherein the plurality of components comprises at least one of a processor, a bus management unit, an MPEG decoder, a direct memory access unit, a graphics unit, a device unit, and a video unit.

20. A method of communicating over a bus for interconnecting a plurality of components, the bus including a plurality of unidirectional data signal lines, at least one unidirectional tag signal line, and one or more unidirectional flow control signal lines, wherein the bus is configured as a ring with segments of the bus chaining from one component to another so as to reduce the amount of global wiring between the plurality of components, and wherein at least one component serves as a beginning and an end of the ring, the method comprising acts of:

for each of one or more bus cycles, setting a plurality of unidirectional data signal lines in a downstream direction, wherein during each of the one or more bus cycles, the plurality of data signal lines include at least a portion of one or more data objects;

for each of the one or more bus cycles, setting at least one unidirectional tag signal line in a downstream direction, wherein the at least one tag signal line indicates how the data signal lines should be interpreted when received at any of the plurality of components; and for each of the one or more bus cycles, if data flow over one or more segments of the bus should stall for at least one bus cycle, setting one or more unidirectional flow control signal lines in an upstream direction over the one or more bus segments that should stall.

21. A method as recited in claim 20, wherein at least one of the one or more data objects comprises an address object that includes at least one of an address portion, a component identifier portion, and a command portion.

22. A method as recited in claim 21, wherein a component receives the address object, the method further comprising an act of setting the at least one tag signal line to indicate that the component has claimed the address object.

23. A method as recited in claim 21, wherein a component receives the address object, the method further comprising an act of examining the component identifier portion of the address object to determine that the address object is directed to the component.

24. A method as recited in claim 23, wherein the command portion of the address object indicates a read operation, the method further comprising acts of:

setting the one or more flow control signal lines to stall one or more upstream segments of the bus while the first component performs the read operation;

retrieving data corresponding to an address specified in the address portion of the address object;

setting the plurality of data signal lines in accordance with the retrieved data; and setting the one or more flow control signal lines to restore data flow in the previously stalled one or more upstream bus segments.

25. A method as recited in claim 23, wherein the command portion of the address object indicates a write operation, and wherein the component receives a write data object that comprises a data portion, the method further comprising acts of:

if the component is unable to handle the write operation for one or more bus cycles, setting the one or more flow control signal lines to stall one or more upstream segments of the bus until the component is able to handle the write operation, and then setting the one or more flow control signal lines to restore data flow in the previously stalled one or more upstream bus segments;

receiving the write data object over one or more bus cycles; and writing at least the data portion of the write data object to an address specified in the address portion of the address object.

26. A method as recited in claim 20, the method further comprising acts of:

the at least one component that serves as a beginning and the end of the ring monitoring the one or more data objects communicated over the, bus as the one or more data objects return;

examining the at least one tag signal line in a bus cycle that immediately follows an indication by the at least one tag signal line that the plurality of data signal lines are set with a last portion of an address object; and if the examined at least one tag signal line fails to indicate that the address object was claimed, generating an error condition for the unclaimed address object.

27. A method as recited in claim 20, wherein a data object comprises more data than the plurality of data signal lines are able to carry in a single bus cycle, and wherein the bus comprises a plurality of tag signal lines, the method further comprising acts of:

dividing the data object into a plurality of portions, one for each of a plurality of bus cycles;

for each of the plurality of bus cycles, setting the plurality of data signal lines based on the portion of the data objects that corresponds to a particular bus cycle;

for each of the plurality of bus cycles except a last bus cycle, setting the plurality of tag signal lines to indicate that that the data signal lines are set with some portion of the data object other than a last portion of the data object; and for the last of the plurality of bus cycles, setting the plurality of tag signal lines to indicate that the data signal lines are set with the last portion of the data object.

28. A method as recited in claim 20, wherein the at least one component that serves as the beginning and the end of the ring maintains ordering of the one or more data objects on the bus by setting the plurality of data signal lines such that (i) only one data object is allowed on the bus at any given time, (ii) multiple data objects are allowed on the bus only if directed to a single component, or (iii) a subsequent data object is allowed on the bus only if any previous data object remaining on the bus is directed to a component that is prior to or the same as a component to which the subsequent data object is directed.

29. A method as recited in claim 20, further comprising an act of an upstream component setting the one or more flow control signal lines to match the one or more flow control signal lines set by a downstream component.

30. A method of communicating over a bus for interconnecting a plurality of components, the bus including a plurality of unidirectional data signal lines, at least one unidirectional tag signal line, and one or more unidirectional flow control signal lines, wherein the bus is configured as a ring with segments of the bus chaining from one component to another so as to reduce the amount of global wiring between the plurality of components, and wherein at least one component serves as a beginning and an end of the ring, the method comprising steps for:

during each of one or more bus cycles and in a downstream direction, providing at least a portion of one or more data objects to one or more downstream components;

for each of the one or more bus cycles and in a downstream direction, indicating how the at least a portion of one or more data objects should be interpreted when processed by any of the one or more downstream components; and for each of the one or more bus cycles and in an upstream direction, controlling data flow in one or more upstream bus segments as needed.

31. A method as recited in claim 30, wherein at least one of the one or more data objects comprises an address object that includes at least one of an address portion, a component identifier portion, and a command portion.

32. A method as recited in claim 31, wherein the command portion of the address object indicates a read operation, the method further comprising a step for a component claiming the address object.

33. A method as recited in claim 31, wherein the command portion of the address object indicates a read operation, the method further comprising steps for:

a component controlling data flow in one or more upstream bus segments while performing the read operation; and the component providing data requested by the read operation.

34. A method as recited in claim 31, wherein the command portion of the address object indicates a write operation, the method further comprising steps for:

a component controlling data flow in one or more upstream bus segments while performing the write operation; and the component storing data in accordance with the write operation.

35. A method as recited in claim 31, further comprising a step for determining if the address object is claimed by any of the plurality of components.

36. A method as recited in claim 30, further comprising a step for maintaining the order of the one or more data objects on the bus.

* * * * *